(12) United States Patent
Gunness

(10) Patent No.: US 10,820,684 B2
(45) Date of Patent: Nov. 3, 2020

(54) MAKEUP BRUSH

(71) Applicant: Andrea Gunness, Gallatin, TN (US)

(72) Inventor: Andrea Gunness, Gallatin, TN (US)

(*) Notice: Subject to any disclaimer, the term of this patent is extended or adjusted under 35 U.S.C. 154(b) by 65 days.

(21) Appl. No.: 16/139,099

(22) Filed: Sep. 24, 2018

(65) Prior Publication Data

US 2020/0093247 A1    Mar. 26, 2020

(51) Int. Cl.
| | |
|---|---|
| A46B 9/02 | (2006.01) |
| A45D 33/00 | (2006.01) |
| A46B 3/04 | (2006.01) |
| A46B 5/00 | (2006.01) |
| A46B 7/04 | (2006.01) |
| A46D 3/00 | (2006.01) |
| A46D 3/04 | (2006.01) |
| B29C 69/00 | (2006.01) |
| B29K 29/00 | (2006.01) |
| B29L 31/42 | (2006.01) |

(52) U.S. Cl.
CPC .............. *A46B 9/021* (2013.01); *A45D 33/00* (2013.01); *A46B 3/04* (2013.01); *A46B 5/0095* (2013.01); *A46B 7/042* (2013.01); *A46D 3/00* (2013.01); *A46D 3/045* (2013.01); *A45D 2200/10* (2013.01); *A46B 2200/1046* (2013.01); *B29C 69/00* (2013.01); *B29K 2029/14* (2013.01); *B29L 2031/42* (2013.01)

(58) Field of Classification Search
CPC ......... A46B 9/021; A46B 3/04; A46B 3/0095; A46B 7/042; A46B 3/00; A46B 3/045; A45D 33/00; A45D 3/045; A45D 2200/10; A45D 2200/1046; B29C 69/00; B29K 2029/14; B29L 2031/42
See application file for complete search history.

(56) References Cited

U.S. PATENT DOCUMENTS

| | | | | |
|---|---|---|---|---|
| 3,577,582 | A * | 5/1971 | Aston | A45D 40/28 15/244.1 |
| 5,220,702 | A * | 6/1993 | Howell | A46B 9/06 15/159.1 |
| 6,510,578 | B1 * | 1/2003 | Cyr | A46B 7/04 15/176.1 |
| 9,642,441 | B1 * | 5/2017 | Ajootian | A45D 40/262 |
| 2005/0022326 | A1 * | 2/2005 | Lee | A46B 5/02 15/106 |
| 2010/0095973 | A1 * | 4/2010 | Shrier | A46B 7/04 132/200 |

(Continued)

OTHER PUBLICATIONS

Screenshots of AMAZON advertisement for KLIX makeup brushes, taken Sep. 25, 2019—although listed as "patent pending", Applicant has been unable to identify patent documents.

*Primary Examiner* — Dung Van Nguyen
(74) *Attorney, Agent, or Firm* — Catherine Napjus; Michael Persson; Chisholm, Persson & Ball, PC

(57) ABSTRACT

The method for manufacturing a makeup brush includes: molding a ferrule and welding bristles to the ferrule. The ferrule includes a ferrule inner end; a ferrule outer end; a ferrule body; an interior; and a well. The well has a well base parallel to the ferrule outer end. The well base has an inner side and an outer side. The step of welding the bristles includes the steps of disposing the bristles in contact with the outer side of the well base and exposing the inner side of the well base to welding.

16 Claims, 8 Drawing Sheets

(56) References Cited

U.S. PATENT DOCUMENTS

2010/0101035 A1\* 4/2010 Nakamura ............. A46B 9/021
                                15/160
2012/0298130 A1\* 11/2012 Telwar .................... A46B 3/08
                                132/317
2020/0015579 A1\* 1/2020 Barad ...................... A46B 3/10

\* cited by examiner

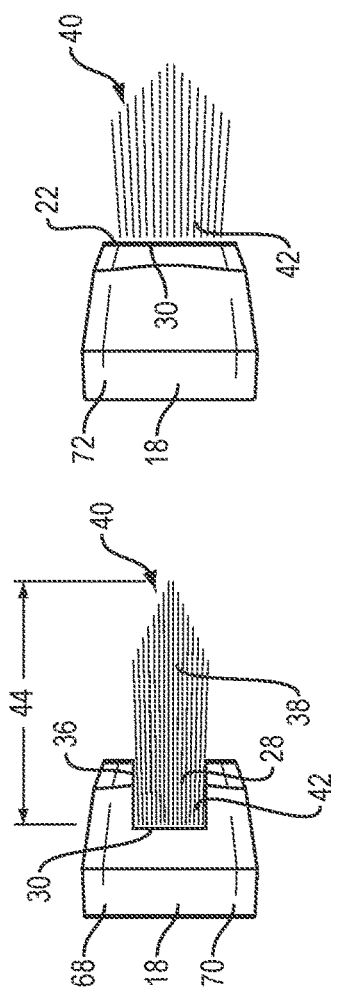
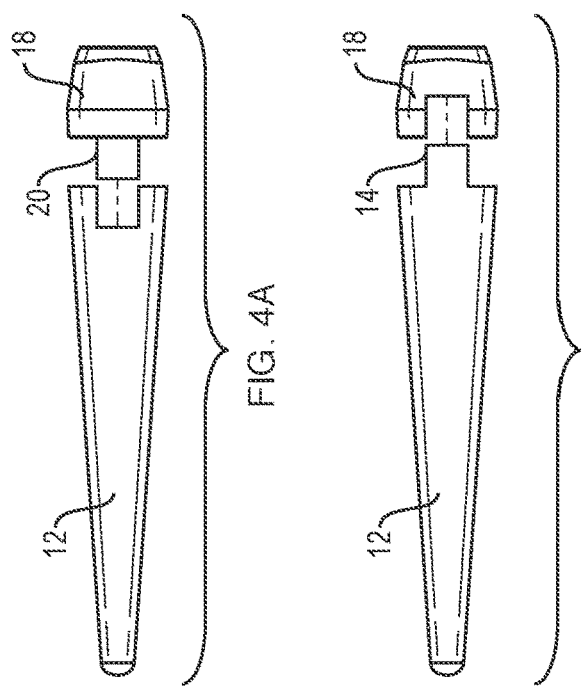
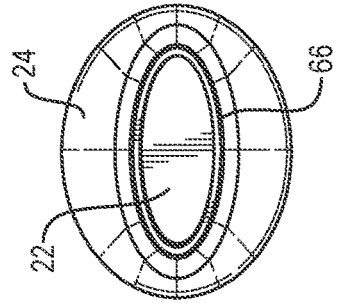
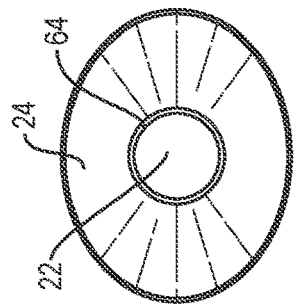

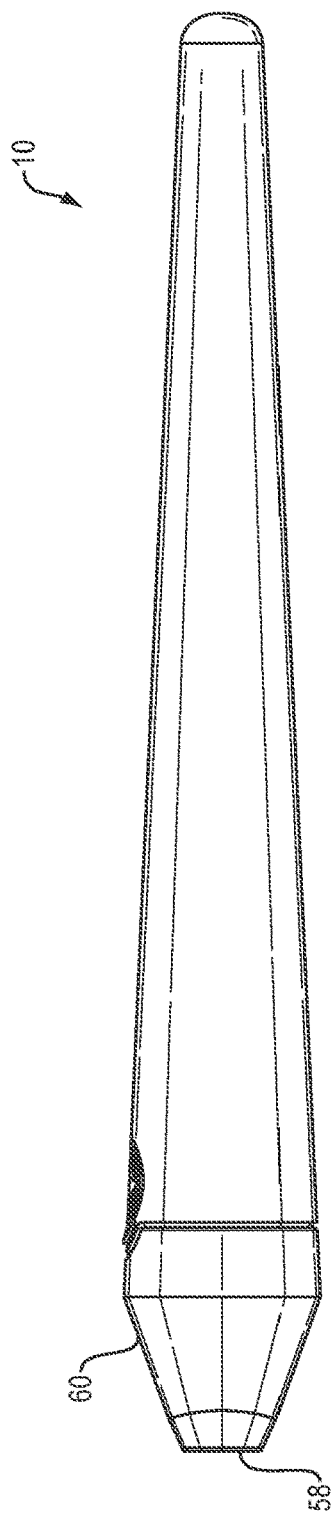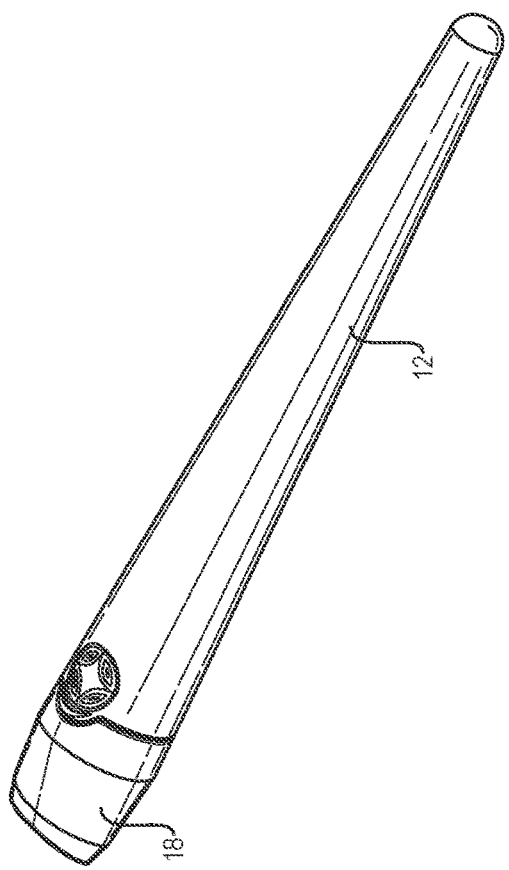
FIG. 8A
FIG. 8B
FIG. 8C

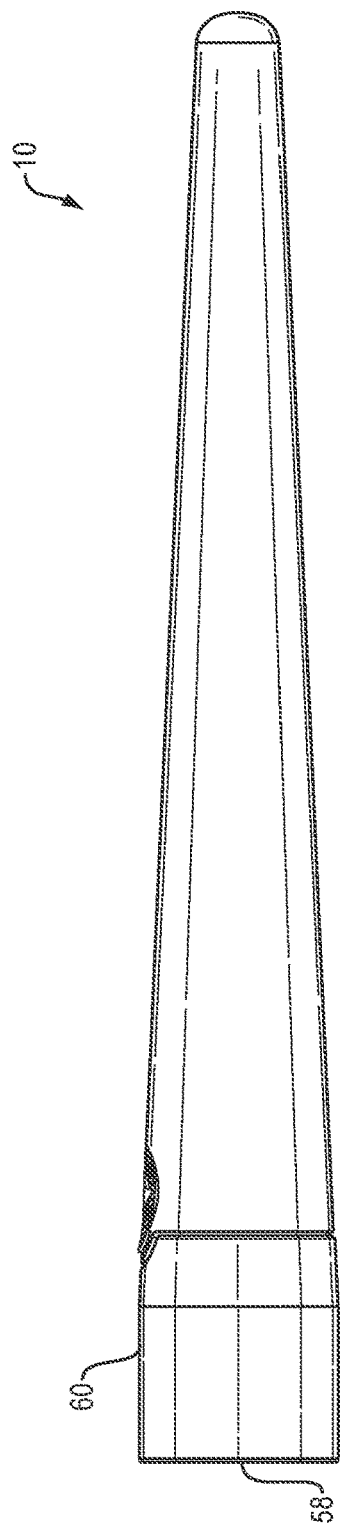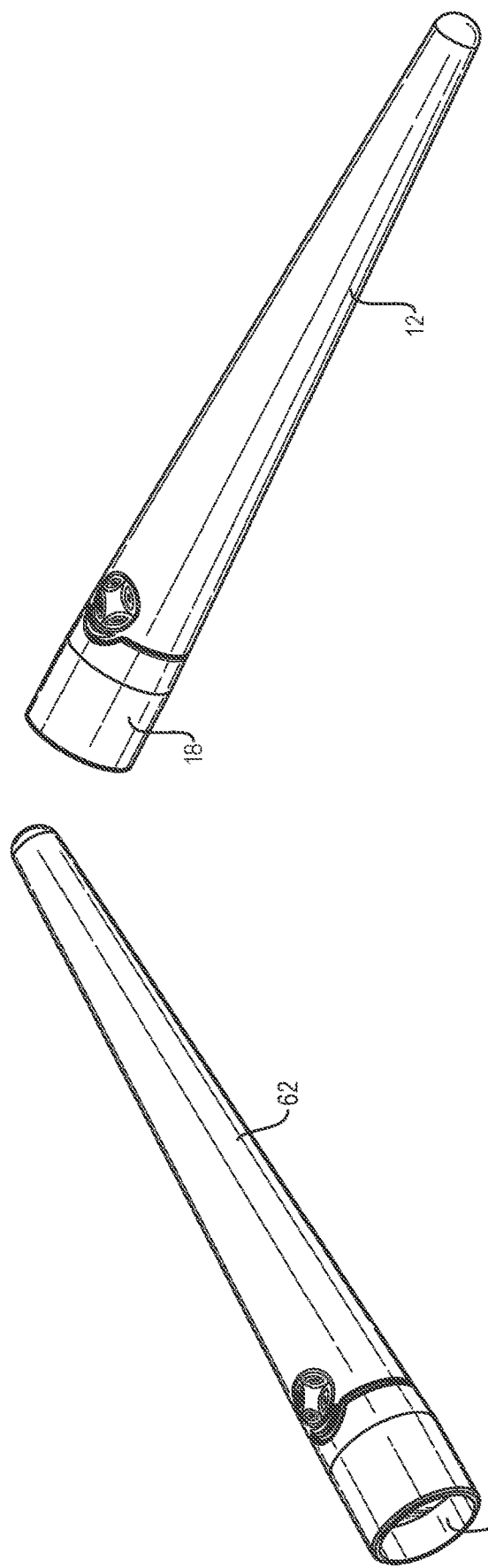
FIG. 10A
FIG. 10B
FIG. 10C

MAKEUP BRUSH

FIELD OF THE INVENTION

The present invention relates to cosmetic application technology, and in particular, to the manufacture of an improved makeup brush and makeup brush itself.

BACKGROUND

Brushes of varying types have almost universal utility, from industrial uses, to personal uses, to artistic endeavors, etc. The bristles of these various brushes may be made of a wide variety of materials, including hair, fur, synthetic filaments, etc. What all of these brushes have in common is that the bristles tend to fall out with use.

Most brushes have a metal or plastic ferrule that hold the bristles in the brush. The bristles are glued or tied within the ferrule to hold them in place. Incomplete gluing during manufacture may cause the bristles to fall out of the brush during use. High-end brushes often maintain their bristles better because they are laid into the ferrule by hand. This requires time-consuming gluing and securing of the bristles, but does result in a better product in so far as bristle loss. Even this, however, is not a complete solution, as the brush will ultimately still lose bristles. Obviously, if the brush loses all of its bristles, it will also have lost all of its utility in that capacity. The loss of only some bristles will not necessarily greatly affect the utility of the brush, however. The loss of the bristles does interfere with the purpose of the application though. The material being applied by the brush and the surface to which the material is being applied may become contaminated with bristles lost from the ferrule.

A further disadvantage in the current design of brushes is that contamination by the glue usually make the bristles and brush non-recyclable or reusable. Another disadvantage is inevitable bacterial contamination of the bristles over time. Regular cleaning of the brushes requires specialized products in which the brushes must be immersed. After this immersion, the brushes must dry. All in all, the cleaning is an expensive and time-consuming process. Moreover, the cleaning process further breaks down the shape and structure of the brush, as well as the glue holding the bristles in place within the ferrule. This ends up exacerbating the original problem discussed above, of bristle loss. In short, even the most expensive and carefully laid-in brush will eventually degrade to the point where it must be replaced. Unfortunately, these unusable brushes are then deposited in landfills, as there is no way to recycle these items.

At least one company, GEKA GmbH has recognized these problems and taken steps to address them. While they have several technologies relevant to these problems, the most relevant reference is U.S. Pat. No. 9,433,280. This patent discloses a molded lip brush whose bristles are integrally injection molded onto its distal end. Although this disclosure may address the problem of the brush losing bristles, it includes additional features, such as a bending element that is flexible in at least one plane, which makes the brush complicated and expensive, and likely still not recyclable. In addition, creating the molds for injection molded bristles may make this product cost prohibitive.

Therefore there is a need for a makeup brush that is inexpensive to produce; does not lose bristles; is entirely recyclable; and includes several brush heads that may be used for different applications and that may be replaced over a universal handle.

SUMMARY OF THE INVENTION

The present invention is a method for manufacturing an improved makeup brush and the makeup brush manufactured from the method. Although all references herein are to a makeup brush, it is understood that the use of the brush of the present invention need not be limited to makeup application.

In its most basic form, the method for manufacturing an improved makeup brush includes the following steps: molding a ferrule and welding bristles to the well of the ferrule. The ferrule includes a ferrule inner end; a ferrule outer end; a ferrule body with a length extending between the inner and outer ends; an interior; and a well. The well has a well base parallel to the ferrule outer end. The well base has an inner side that faces the interior of the ferrule body and an outer side that faces the ferrule outer end of the ferrule. Each of the bristles includes a bristle outer tip, a bristle inner tip, and a length extending between the bristle outer and inner tips. The step of welding the bristles includes the steps of disposing the bristle inner tips in contact with the outer side of the well base of the ferrule; and exposing the inner side of the well base of the ferrule to welding.

It is preferred that the step of molding the ferrule is accomplished by injection molding, but other types of molding common in the art may be substituted. In preferred embodiments, the well base of the well is set slightly within the interior of the ferrule body. In such embodiments, the well also includes well sides connecting the well base to the ferrule outer end.

It is also preferred that the ferrule include means for connecting the ferrule to a handle of the makeup brush. The connecting means are preferably releasable connecting means. The preferred releasable connecting means are snapping features on each of the ferrule and the handle of the makeup brush, where the ferrule and handle snapping features mate with one another. The preferred ferrule snapping feature is an indentation extending inward from the interior of the ferrule body, which mates with a protrusion extending outward from the handle, which is the handle snapping feature. In another embodiment, the snapping features are reversed so that the ferrule snapping feature is a protrusion extending into the interior of the ferrule body and the handle snapping feature is an indentation that mates with the protrusion. Another means for connecting the ferrule to the handle would be by including mateable threading on each of the ferrule and handle so that they may be screwed together. One of at least ordinary skill in the art will recognize not only that there are many specific embodiments in which these snapping features may be formed, but also that the connecting means take various forms other than as snapping features. Each of these connecting means, whether they are snapping features are not, are contemplated as being within the scope of this invention.

It is preferred that the welding of the bristles to the ferrule base is through infrared, ultrasonic, or laser welding. Importantly, the welding (of whatever type) is applied to the other side of the well base than that from which the bristles extend. Specifically, the inner end of the bristles are disposed in contact with the outer side of the well base, while the welding is applied to the inner side of the well base. The energy of the welding extends through the well base so that the bristle inner ends become integrated with the outer side of the well base. As such, the bristles are never directly exposed to the welding. As the various types of welding may be fairly intense, this protects the bristles from that direct force or energy. Other types of welding than those listed above may be substituted, however, as may other forms of integration, such as injection molding. By integrating the bristles into the ferrule through welding, the ferrule and bristles become as one piece with no seams and no need for additional adhesion, such as with glue, or binding, such as with ties. As such, the bristles cannot fall out of the ferrule, and a disadvantage of the prior art is overcome.

It is preferred that the material out of which the ferrule and the bristles are made is a recyclable material, such as polybutylene terephthalate (PBT), which is a thermoplastic engineering polymer. Other polymers, and especially elastomers, such as those sold under the trademarks HYTREL and GRILFLEX, may be substituted. In addition, the material should be easily cleanable, including being at least somewhat heat and chemical resistant. As the ferrule and bristle combination is preferably recyclable, another disadvantage of the prior art is overcome. Moreover, even if the ferrule does eventually become unusable or undesirable for whatever reason, the ferrule may be recycled while the handle of the makeup brush is continually reused, as the handle and the ferrule inner ends of the ferrules, which connect to the handle, are standardized so that ferrules may be easily swapped out. In this way, one piece, the ferrule, is recycled, and the other piece, the handle, is reused—no part of the makeup brush ends up cluttering a landfill. In addition, plastics, such as those preferred with respect to the present invention, are easily cleaned and may be fairly rigorously cleaned without fear of the bristles falling out. Another disadvantage of the prior art is thus overcome. All of these factors weigh toward an inexpensive product, both to purchase and to maintain.

In its most basic form, the makeup brush of the present invention includes a handle, a ferrule, and a plurality of bristles. The handle has a ferrule end and a holding end. The ferrule includes a ferrule inner end connected to the ferrule end of the handle, a ferrule outer end, an interior, a ferrule body with a length extending between the inner and outer ends and around the interior, and a well at said ferrule outer end, where the well comprises a well base parallel to the ferrule outer end. The well base includes an inner side that faces the interior of the ferrule body and an outer side that faces the ferrule outer end of the ferrule. Each of the plurality of bristles includes a bristle outer tip, a bristle inner tip, and a length extending between the bristle outer and inner tips. The bristles extend out of the ferrule such that the inner tips of the bristles are integrally attached to the outer side of the well base of the ferrule.

The makeup brush of the present invention is a product of the method of the present invention. As such, several features discussed above with reference to the method of the present invention also apply to the makeup brush of the present invention, including that: the well of the ferrule is preferably set within the ferrule, but may be flush with the ferrule outer end; the handle and ferrule are releasably connectable and include means, such as mateable snapping features or threading, for achieving such releasable connectivity; the bristles are welded to the well base of the ferrule; and the ferrule and bristles are made of the same recyclable material, preferably PBT or another polymer. In addition, each of the ferrule outer and inner ends has a diameter. In some embodiments, the ferrule outer diameter is less than the ferrule inner diameter. That is to say, the ferrule tends to taper from where it connects with the handle to its ferrule outer end. It is also preferred that the ferrule outer end be round, such as circular or elliptical in shape. It is also preferred that the handle taper from the ferrule end to the holding end, so that the holding end is smaller than the ferrule end.

Therefore it is an aspect of the present invention that the ferrule is molded, preferably by injection molding.

It is a further aspect of the present invention that the bristles of the brush are made of the same material as the ferrule.

It is a further aspect of the present invention that the bristles of the brush are made integral with the ferrule through welding or other means.

It is a further aspect of the present invention that the ferrule is removable from the handle of the brush.

It is a further aspect of the present invention that the ferrule and handle include corresponding features so that they are releasably mateable, such as indentations and protrusions for snapping the ferrule and handle together or threading for screwing the ferrule and handle together.

It is a further aspect of the present invention that the ferrule and bristles be made of a recyclable material.

It is a further aspect of the present invention that the recyclable material out of which the ferrule and bristles are made is PBT or another polymer, such as thermoplastic elastomers or polymide high performance elastomers.

It is a further aspect of the present invention that the ferrule and bristles be easily cleanable and that cleaning does not break down the shape or structure of the bristles.

It is a further aspect of the present invention that the outer end of the ferrule has a smaller diameter than the inner end of the ferrule.

It is a further aspect of the present invention that the outer end of the ferrule is round in shape, such as circular or elliptical.

It is a further aspect of the present invention that the handle of the makeup brush tapers so that it is larger at its ferrule end and smaller at its holding end.

These aspects of the present invention are not meant to be exclusive and other features, aspects, and advantages of the present invention will be readily apparent to those of ordinary skill in the art when read in conjunction with the following description and accompanying drawings. Although not every feature may be initially claimed, each feature is considered to be a part of the present invention.

BRIEF DESCRIPTION OF THE DRAWINGS

FIGS. 4A and 4B are side cutaway diagrams illustrating different ways that the ferrule and handle may fit together.

FIGS. 5A and 5B are side views of the ferrule showing a well disposed within the ferrule interior and a well flush with the ferrule outer end, respectively.

FIGS. 6A and 6B are top down views of the ferrule with circular and elliptical ferrule outer ends, respectively.

FIGS. 8A-8C are various views of a second embodiment of the makeup brush of the present invention.

FIGS. 10A-10C are various views of a fourth embodiment of the makeup brush of the present invention.

DETAILED DESCRIPTION

Figure 1:
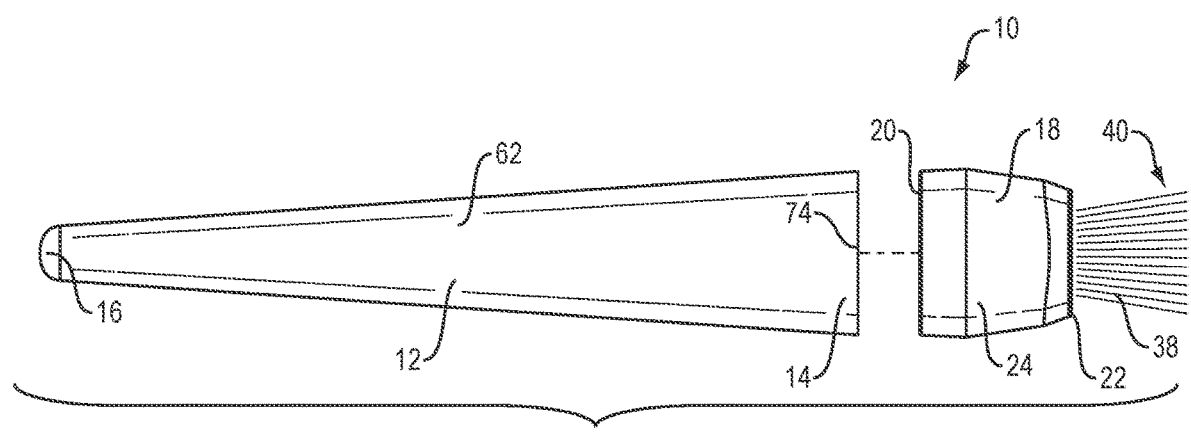
FIG. 1 is a side view of a makeup brush of the present invention.

Referring first to FIG. 1, a side view of a makeup brush 10 of the present invention is provided. Makeup brush 10 includes handle 12 and ferrule 18. Handle 12 has ferrule end 14, where handle 12 connects to ferrule 18, and holding end 16, where a user will hold handle 12. Handle 12 preferably tapers 62 from ferrule end 14 to holding end 16 so that ferrule end 14 is wider than holding end 16. It is understood, however, that handle 12 may be uniform in width. Handle 12 may include cap 74 that covers ferrule end 14. Ferrule 18 includes ferrule inner end 20, which connects with ferrule end 14 of handle 12, and ferrule outer end 22, which faces away from handle 12. Ferrule 18 also includes ferrule body 24. Although shown more clearly in FIG. 2A, it is understood that ferrule body 24 has an interior 68 and well 28. Bristles 38 with bristle outer tips 40 extend from ferrule outer end 22. Throughout these FIGS., the discussion focuses on handle 12 and ferrule 18 being separate pieces that may be releasably connected. It is understood, however, that in some embodiments, handle 12 and ferrule 18 are a single, permanently integrated makeup brush 10.

Figure 2A:
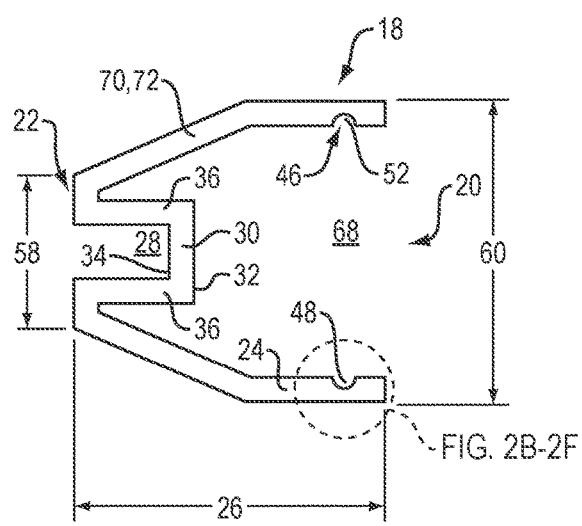
FIG. 2A is a side cutaway diagram of a ferrule of a makeup brush of the present invention.

Now referring to FIG. 2A, a side cutaway diagram of ferrule 18 is provided. Ferrule outer end 22 has diameter 58. Ferrule inner end 20 has diameter 60. As shown, and as preferred, diameter 58 of ferrule outer end 22 is less than diameter 60 of ferrule inner end 20. Ferrule 18 is preferably made of recyclable material 70, such as PBT 72. In this view, we see well 28. Well 28 is disposed parallel 76 to ferrule outer end 22. In the embodiment shown, well 28 extends into interior 68 of ferrule 18 and includes well sides 36 connecting ferrule outer end 22 to well base 30. In other embodiments, such as that shown in FIG. 5B, for example, well 28 is flush with ferrule outer end 22 and does not include well sides 36. Well base 30 includes inner side 32, which faces toward interior 68 of ferrule 18, and outer side 34, which faces away from interior 68. During the method of the present invention, bristle inner tips 42 (shown in FIGS. 5A and 5B) are disposed in contact with outer side 34 of well base 30 and welding is applied to inner side 32 of well base 30. This welding permanently integrates bristles 38 with ferrule 18.

Figure 3A:
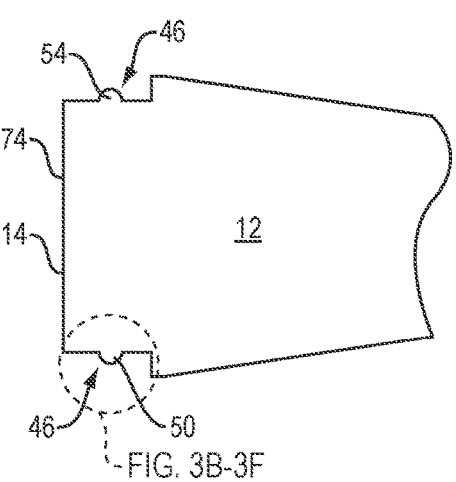
FIG. 3A is a partial side view of a handle of a makeup brush of the present invention.
Figure 2B:
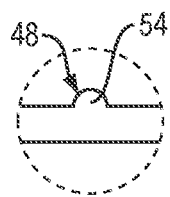
FIGS. 2B-2F are blown up views of several embodiments of connecting means on the ferrule shown in FIG. 2A.
Figure 3B:
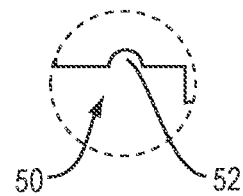
FIGS. 3B-3F are blown up views of several embodiments of connecting means on the handle shown in FIG. 3A, where the handle connecting means shown in FIGS. 3A-3F are releasably mateable with the ferrule connecting means shown in FIGS. 2A-2F, respectively.
Figure 3C:
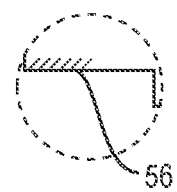

Still referring to FIG. 2A, on the right, we see an example of connecting means 46. Connecting means 46 are for connecting handle 12 and ferrule 18. In the preferred embodiment, as shown, the wall of the interior 68 of ferrule 18 includes an indentation 52, which is a ferrule snapping feature 48. Referring also to FIG. 3A, the remainder of the preferred connecting means 46 are shown in a partial side diagram of handle 12, in the form of handle snapping feature 50, which in this embodiment is protrusion 50, which releasably mates with indentation 52. One of ordinary skill in the art will recognize that there are several variations on this basic idea of ferrule and handle snapping features 48, 50. We now also refer to FIGS. 2B-2F and 3B-3F, which are exploded views of the sections of 2A and 3A that are circled with dashed lines. For example, as shown in FIGS. 2B and 3B, ferrule snapping feature 48 may be protrusion 54 (as opposed to indentation 52 shown in FIG. 2B) and handle snapping feature 50 may be indentation 52.

Figure 2C:
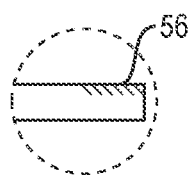
Figure 2D:
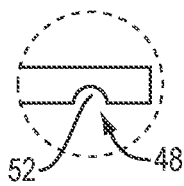
Figure 3D:
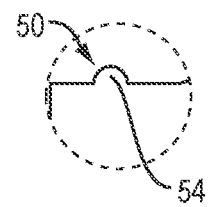
Figure 2E:
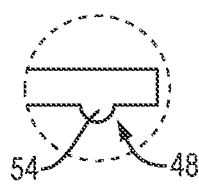
Figure 3E:
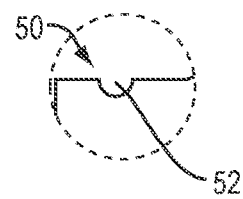
Figure 2F:
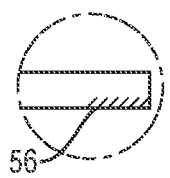
Figure 3F:
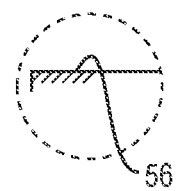

Referring now also to FIGS. 4A and 4B, side views of two versions of makeup brush 10 are shown. In FIG. 4A, ferrule 18 slips into handle 12, where dotted lines show where ferrule inner end 20 will set within handle 12. In FIG. 4B, handle 12 slips into ferrule 18, where dotted lines shown were ferrule end 14 of handle 12 will set within ferrule 18. In FIGS. 2A and 3A (together) and FIG. 4B, ferrule 18 and handle 12 are shown as preferred, where handle 12 will slip into ferrule 18, and, once unified, handle 12 and ferrule 18 will appear fairly flush with one another. As shown in FIG. 4A, however, another embodiment would have ferrule 18 slip into handle 12. In this embodiment, other variations of ferrule and handle snapping features 48, 50 are possible. For example, as shown in FIGS. 2D and 3D, as with FIGS. 2A and 3A, ferrule snapping feature 48 is indentation 52 and handle snapping feature 50 is protrusion 54, but unlike FIGS. 2A and 3A, indentation 52 is on the outside of ferrule 18 and protrusion 54 is on the inside of handle 12. Similarly, as shown in FIGS. 2E and 3E, like FIGS. 2B and 3B, ferrule snapping feature 48 is protrusion 54 and handle snapping feature 50 is indentation 52, but unlike FIGS. 2B and 3B, protrusion 54 is on the outside of ferrule 18 and indentation 52 is on the inside of handle 12.

Additionally, as shown in FIGS. 2C, 2F, 3C, and 3F, coordinating threading 56 may be included on the inside or outside of ferrule 18 and/or handle 12, such that ferrule 18 and handle 12 may be releasably screwed together, whether they are disposed as shown in FIG. 4A or 4B. Although snapping features 48, 50 and threading 56 are illustrated as the preferred connecting means 46, one of at least ordinary skill in the art will recognize that ferrule 18 and handle 12 may be releasably connected in many different manners, and each of these is considered to be within the scope of the present invention.

Now referring to FIGS. 5A and 5B, side views of ferrule 18 showing well 28 disposed within ferrule interior 68, and well 28 flush with ferrule outer end 22 are provided, respectively. In FIG. 5A, well 28 has well sides 36 that extend well 28 into interior 68 of ferrule 18. In FIG. 5B, well 28 has no depth and no well sides 36. Instead, well 28 is disposed directly at ferrule outer end 22. In both of FIGS. 5A and 5B, bristles 38 are attached at their bristle inner tips 42 to outer side 34 of well base 30 (shown most clearly in FIG. 2A) and a bristle length 44 extends out therefrom to bristle outer tips 40. Although it is preferred that well 28 include depth, as shown in FIG. 5A, having bristles 38 extend directly out from ferrule outer end 22, may be preferable for certain types of brushes. In such embodiments, practically speaking, well base 30 and ferrule outer end 22 are the same feature, but the details discussed above concerning how bristle inner tips 42 are disposed in contact with the outer side 34 of well base 30 and welding is applied to the inner side 32 of well base 30 are applicable in either of the embodiments shown in FIGS. 5A and 5B.

Now referring to FIGS. 6A and 6B, top down views of ferrule 18 with circular 64 and elliptical 66 ferrule outer ends 22 are provided, respectively. Ferrule inner end 20 is always the same shape and size as ferrule end 14 of handle 12, so that they may mate, and importantly, so that handle 12 may mate with any ferrule 18. Ferrule outer end 22 has no direct contact with handle 12, however, so it may accommodate different shapes, as shown in FIGS. 6A and 6B. It is understood that ferrule outer ends 22 may be any shape and the round shapes illustrated herein are merely exemplary.

Figure 7A:
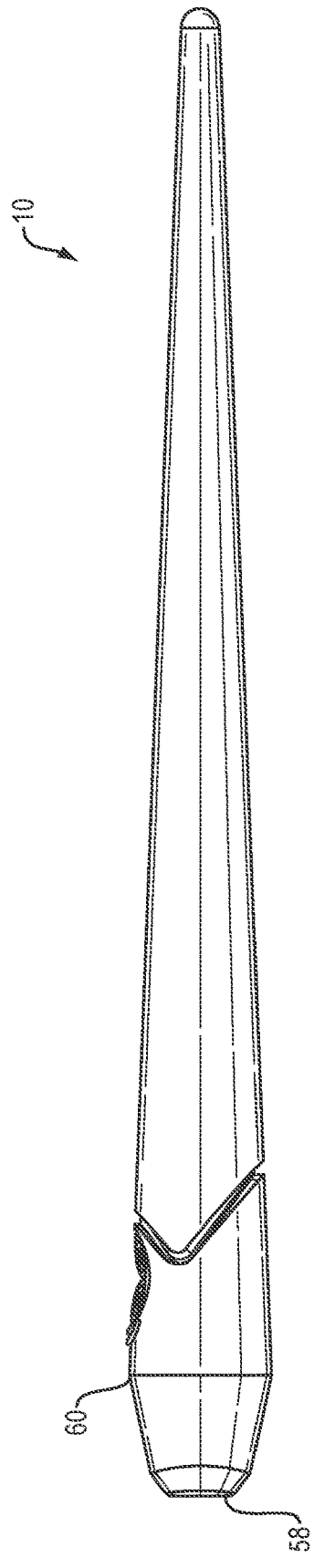
FIGS. 7A-7C are various views of one embodiment of the makeup brush of the present invention.
Figure 7C:
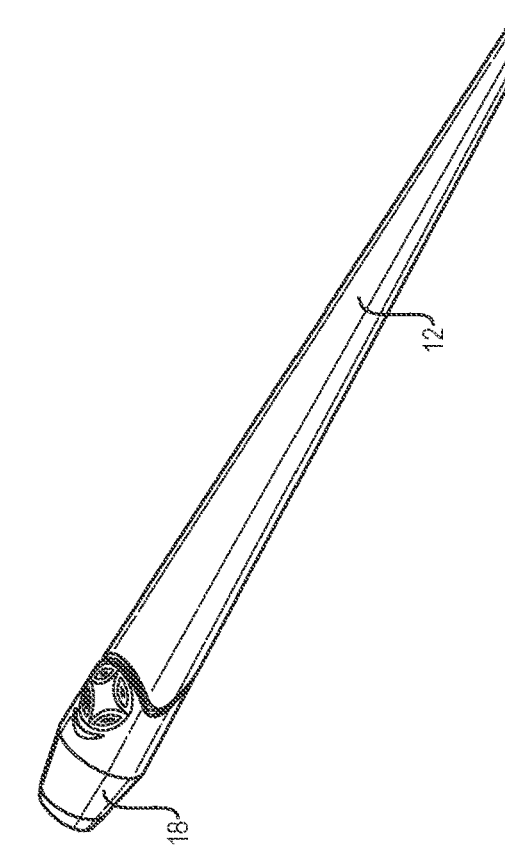
Figure 7B:
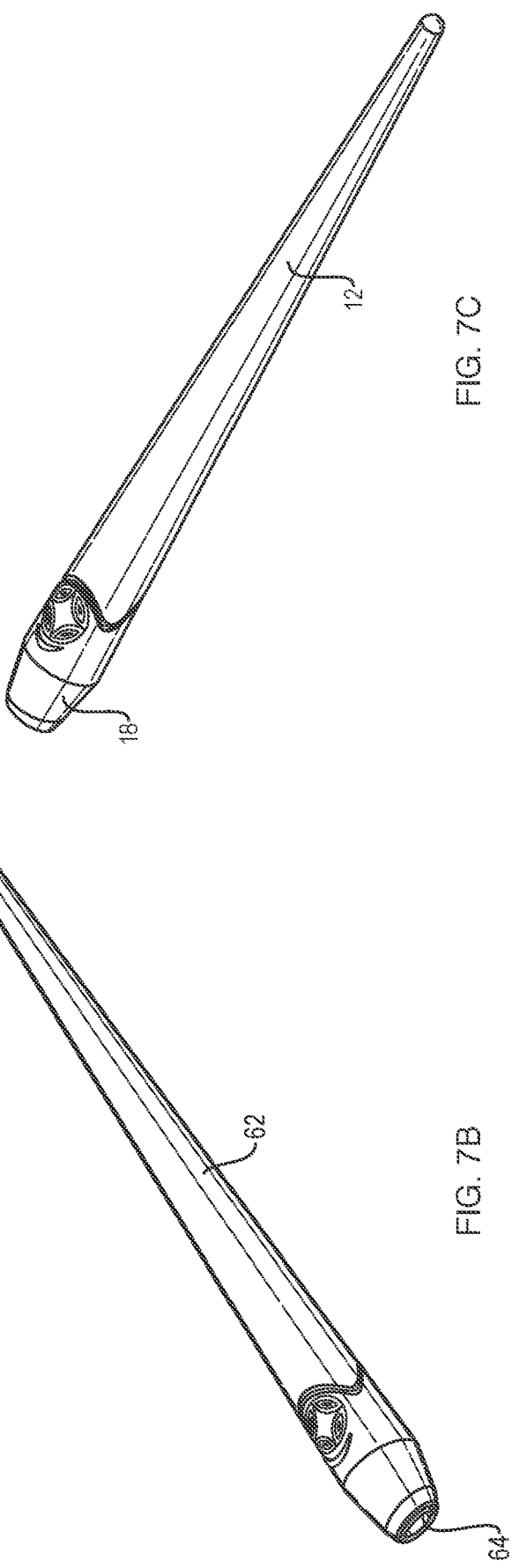
Figure 9A:
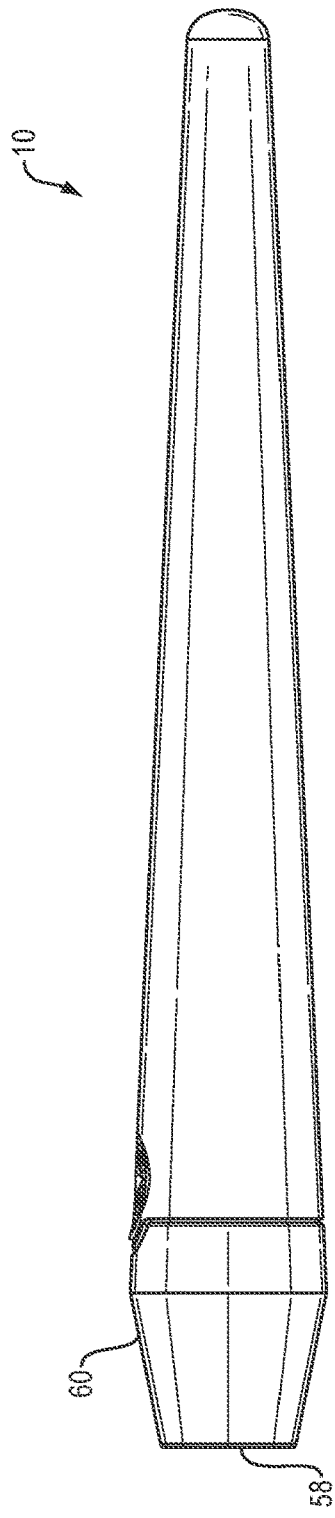
FIGS. 9A-9C are various views of a third embodiment of the makeup brush of the present invention.
Figure 9C:
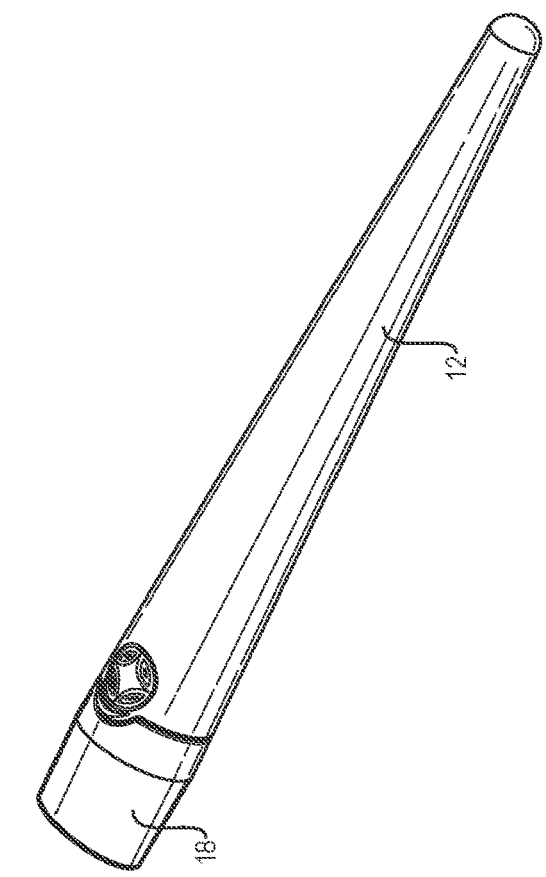
Figure 9B:
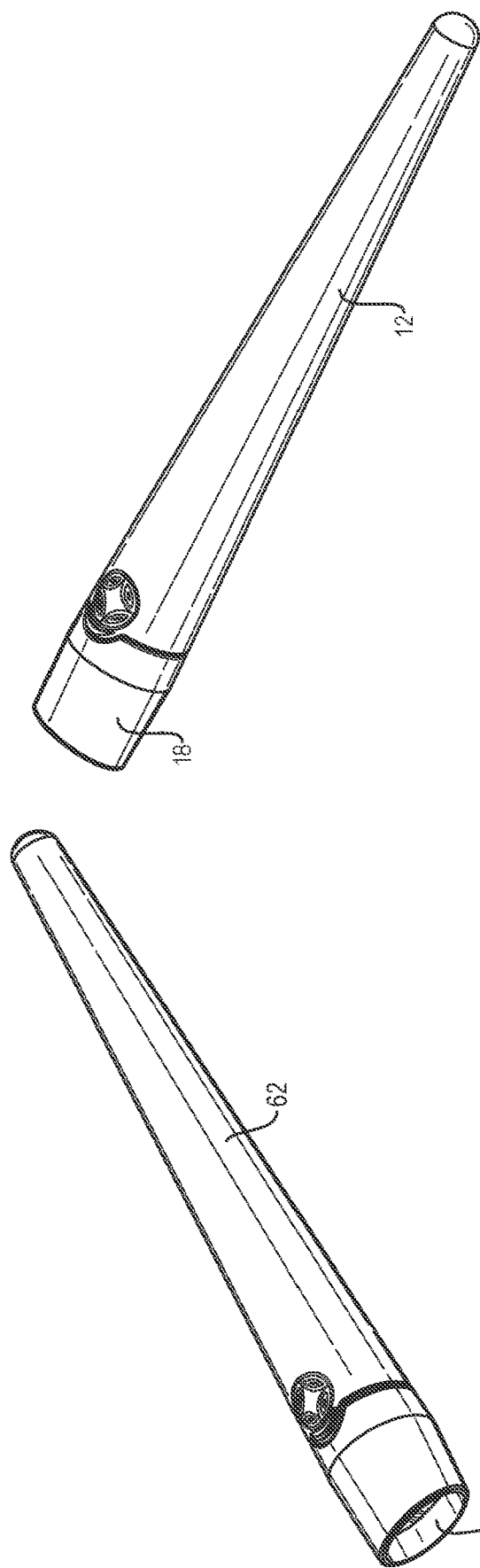

Now referring to FIGS. 7A-10C, various views of various embodiments of makeup brush 10 of the present invention are provided. The handles 12 of each embodiment are similar in length and similar in that they include tapering 62. The main differences are, instead, in the respective ferrules 18, as discussed below. FIGS. 7A-7C illustrate an eye liner brush according to the present invention. Ferrule outer end diameter 58 is less than ferrule inner end diameter 60, and ferrule outer end 22 has circular shape 64. FIGS. 8A-8C illustrate a foundation brush according to the present invention. Ferrule outer end diameter 58 is less than ferrule inner end diameter 60, and ferrule outer end 22 has elliptical shape 66. FIGS. 9A-9C illustrate blush brush according to the present invention. Ferrule outer end diameter 58 is less than ferrule inner end diameter 60, but the difference in the diameters 58, 60 is not as great as the difference illustrated in FIGS. 8A-8C, for example. Also like the makeup brush 10 shown in FIGS. 8A-8C, the blush brush shown in FIGS. 9A-9C has a ferrule outer end 22 with an elliptical shape 66. The minor axis of the elliptical shape 66 shown in FIG. 9B, however, is greater than the minor axis of the elliptical shape 66 shown in FIG. 8B, making the elliptical shape 66 shown in FIG. 9B rounder, or closer to being circular, than that shown in FIG. 8C. FIGS. 10A-10C illustrate a powder brush according to the present invention. In this embodiment, ferrule outer end diameter 58 and ferrule inner end diameter 60 are equal, and ferrule outer end 22 has circular shape 64. The makeup brushes 10 shown in FIGS. 7A-10C illustrate some of the variations possible within the scope of the present invention.

Figure 11:
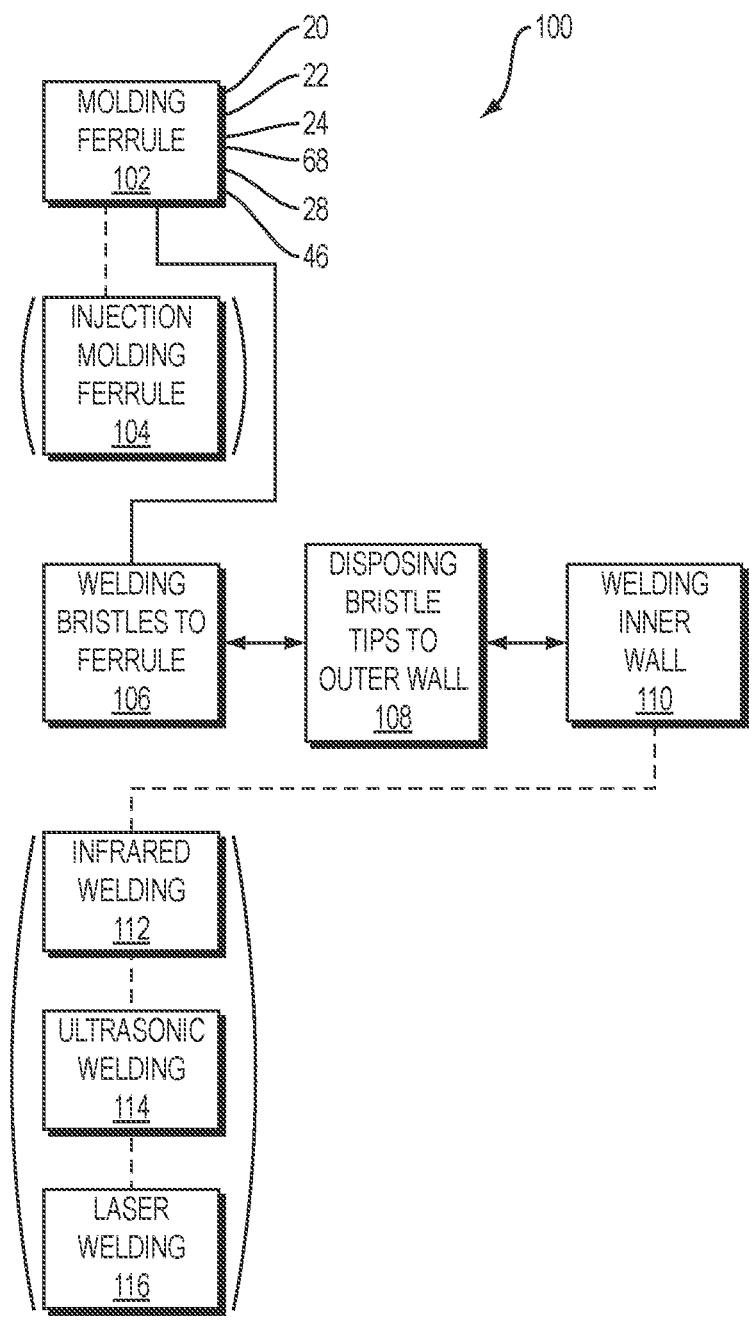
FIG. 11 is a flow chart identifying the steps of the method of the present invention.

Now referring to FIG. 11, a flow chart of method 100 of the present invention is provided. Method 100 includes molding the ferrule 102 and welding the bristles to the ferrule 106. The first step is molding ferrule 102. This step includes molding all of the required features of ferrule 18, including ferrule inner end 20, ferrule outer end 22, ferrule body 24, ferrule interior 68, ferrule well 28, and connecting means 46, all of which are discussed at length above. Although not all features of ferrule 18 may be listed here, it is understood that all features of ferrule 18 are molded in step 102. It is preferred that the step of molding ferrule is accomplished through injection molding 104. This step 104 is shown as dashed lines from step 102 and in parentheses to indicate that it is not a separate step from step 102, but a preferred manner of accomplishing step 102. In this context, injection molding has its common meaning within the art and analogous arts. That is to say, injection molding is a manufacturing process for producing parts by injecting molten material into a mold. In the present case, the molten material is preferably PBT or other elastomers or thermoplastic and thermosetting polymers, as discussed above.

The second step is welding bristles to the ferrule 106. This step 106 includes the substeps of disposing bristle tips to outer wall 108 and welding inner wall 110. Step 108 includes disposing the bristle inner tips 42 in contact with the outer side 34 of base well 30 (as shown, for example in FIGS. 2A and 5A). Step 110 includes applying welding to the inner wall 32 of base well 30 (shown in FIG. 2A). Step 110 is preferably accomplished through infrared welding 112, ultrasonic welding 114, or laser welding 116. Again steps 112, 114, and 116 are shown as dashed lines from step 110 and in parentheses to indicate that they are examples of accomplishing step 110, rather than separate steps. In this context, infrared welding has its common meaning within the art and analogous arts. That is to say, infrared welding is a non-contact thermal welding technique that heats thermoplastic parts to molten temperatures so that they may be permanently joined together. In this context, ultrasonic welding has its common meaning within the art and analogous arts. That is to say, ultrasonic welding is an industrial technique whereby high-frequency ultrasonic acoustic vibrations are locally applied to workpieces being held together to create a solid-state weld. It is commonly used for plastics, such as the polymers preferred in the current invention and discussed elsewhere herein. In this context, laser welding has its common meaning within the art and analogous arts. That is to say, laser welding or laser beam welding or LBW is a welding technique used to join pieces of metal or thermoplastics through the use of a laser. The laser beam provides a concentrated heat source, allowing for robust welds and high welding rates. Although the welding techniques described herein are preferred, one of ordinary skill in the art will recognize that other welding techniques common in the art may be substituted.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A makeup brush comprising:
   a handle with a ferrule end and a holding end;
   a ferrule comprising:
      a ferrule inner end connectable to said ferrule end of said handle;
      a ferrule outer end;
      an interior;
      a round ferrule body with a ferrule length extending between said inner and outer ends and around said interior; and
      a well disposed at said ferrule outer end, wherein said well comprises a well base parallel to said ferrule outer end, wherein said well base comprises an inner side that faces toward said interior of said ferrule body and an outer side that faces away from said interior of said ferrule;
   a plurality of bristles, wherein:
      each of said bristles comprises a bristle outer tip, a bristle inner tip, and a bristle length extending between said bristle outer and inner tips;
      said bristles extend out of said ferrule; and
      said inner tips of said bristles are integrally attached to said outer side of said well base of said ferrule; and
   means for releasably connecting said ferrule to said handle, wherein:
      said ferrule inner end is releasably connected to said ferrule end of said handle;
      said means for releasably connecting said ferrule to said handle comprises a ferrule snapping feature disposed on said ferrule that releasably mates with a handle snapping feature disposed on said handle;
      said ferrule snapping feature is one of an indentation in or a protrusion from said ferrule body and said handle snapping feature is an other of a protrusion from or an indentation in said handle, wherein said indentation and said protrusion are releasably snapped with one another; and
      said indentation in or protrusion from said ferrule body extends at least partially around said round ferrule body and said protrusion from of indentation in said handle correspondingly extends at least partially around said handle.

2. The makeup brush as claimed in claim 1, wherein said well base of said well of said ferrule is disposed slightly within said interior of said ferrule body and said well further comprises well sides connecting said well base to said ferrule outer end.

3. The makeup brush as claimed in claim 1, wherein said ferrule outer end comprises a ferrule outer end diameter and said ferrule inner end comprises a ferrule inner end diameter and said ferrule outer end diameter is less than said ferrule inner end diameter.

4. The makeup brush as claimed in claim 1, wherein said handle is tapered such that said ferrule end is larger than said holding end.

5. The makeup brush as claimed in claim 1, wherein said ferrule and said bristles are made of a recyclable material.

6. The makeup brush as claimed in claim 1, wherein said ferrule and said bristles are made of PBT.

7. The makeup brush as claimed in claim 1, wherein said ferrule outer end is circular in shape.

8. The makeup brush as claimed in claim 1, wherein said ferrule outer end is elliptical in shape.

9. The makeup brush as claimed in claim 1, wherein said ferrule end of said handle is covered by a cap.

10. The makeup brush as claimed in claim 1, wherein said ferrule consists of:
    said ferrule inner end connectable to said ferrule end of said handle;
    said ferrule outer end;
    said interior;
    said round ferrule body with said ferrule length extending between said inner and outer ends and around said interior; and
    said well disposed at said ferrule outer end, wherein said well comprises a well base parallel to said ferrule outer end, wherein said well base comprises an inner side that faces toward said interior of said ferrule body and an outer side that faces away from said interior of said ferrule.

11. A makeup brush comprising:
    a handle with a ferrule end and a holding end;
    a ferrule comprising:
        a ferrule inner end connectable to said ferrule end of said handle;
        a ferrule outer end, wherein said ferrule outer end is elliptical in shape;
        an interior;
        a ferrule body with a ferrule length extending between said inner and outer ends and around said interior; and
        a well disposed at said ferrule outer end, wherein said well comprises a well base parallel to said ferrule outer end, wherein said well base comprises an inner side that faces toward said interior of said ferrule body and an outer side that faces away from said interior of said ferrule;
    a plurality of bristles, wherein:
        each of said bristles comprises a bristle outer tip, a bristle inner tip, and a bristle length extending between said bristle outer and inner tips;
        said bristles extend out of said ferrule; and
        said inner tips of said bristles are integrally attached to said outer side of said well base of said ferrule, wherein said integral attachment is achieved through welding said inner side of said well of said ferrule.

12. The makeup brush as claimed in claim 11, wherein said well base of said well of said ferrule is disposed slightly within said interior of said ferrule body and said well further comprises well sides connecting said well base to said ferrule outer end.

13. The makeup brush as claimed in claim 11, further comprising means for releasably connecting said ferrule to said handle, wherein said ferrule inner end is releasably connected to said ferrule end of said handle.

14. The makeup brush as claimed in claim 13, wherein:
    said ferrule body is a round ferrule body;
    said means for releasably connecting said ferrule to said handle comprises a ferrule snapping feature disposed on said ferrule that releasably mates with a handle snapping feature disposed on said handle;
    said ferrule snapping feature is one of an indentation in or a protrusion from said ferrule body and said handle snapping feature is an other of a protrusion from or an indentation in said handle, wherein said indentation and said protrusion are releasably snapped with one another; and
    said indentation in or protrusion from said ferrule body extends at least partially around said round ferrule body and said protrusion from of indentation in said handle correspondingly extends at least partially around said handle.

15. The makeup brush as claimed in claim 13, wherein said ferrule body is a round ferrule body and said means for releasably connecting said ferrule to said handle comprise corresponding threading on said ferrule and on said handle such that said ferrule and said handle releasably screw together.

16. The makeup brush as claimed in claim 11, wherein said ferrule consists of:
    said ferrule inner end connectable to said ferrule end of said handle;
    said ferrule outer end;
    said interior;
    said round ferrule body with said ferrule length extending between said inner and outer ends and around said interior; and
    said well disposed at said ferrule outer end, wherein said well comprises a well base parallel to said ferrule outer end, wherein said well base comprises an inner side that faces toward said interior of said ferrule body and an outer side that faces away from said interior of said ferrule.

* * * * *